United States Patent [19]

Serinken et al.

[11] Patent Number: 4,503,468
[45] Date of Patent: Mar. 5, 1985

[54] INTERACTIVE VIEWGRAPH SYSTEM

[75] Inventors: Nur M. Serinken, Kanata; Iain D. Calder, Nepean; James Gale, Kanata; Norman C. Fletcher, Almonte, all of Canada

[73] Assignee: Northern Telecom Limited, Montreal, Canada

[21] Appl. No.: 309,977

[22] Filed: Oct. 9, 1981

[51] Int. Cl.³ .............................................. H04N 1/22
[52] U.S. Cl. ................... 358/256; 358/102; 358/236; 358/296; 358/347; 179/2 TV
[58] Field of Search ............... 358/293, 256, 102, 213, 358/903, 347, 348, 344, 296, 302, 231, 236; 179/2 TV

[56] References Cited

U.S. PATENT DOCUMENTS

Re. 28,375  3/1978  Maydan et al. .................. 358/231
3,936,596  2/1976  Inuiya .............................. 358/102

OTHER PUBLICATIONS

A. F. Higginbotham et al., "Teleconference Systems" I.B.M. Technical Disclosure Bulletin, vol. 22, No. 9, 2-80.
L. Kool, "The Scribophone: A Graphic Telecommunication System" Philips Telecommunication Review, vol. 38, No. 1, 1/80.

Primary Examiner—Howard W. Britton
Assistant Examiner—Edward L. Coles
Attorney, Agent, or Firm—Stuart L. Wilkinson

[57] ABSTRACT

At each of a pair of linked terminals, an image is generated at local and remote input devices. The generated image is projected onto a viewing screen and, while exhibited, further locally or remotely generated data is used to alter the generated image and, consequently, to alter the projected image. Data can, for example, be generated by means of a document scanner and a manually operated X-Y pen digitizer.

12 Claims, 1 Drawing Figure

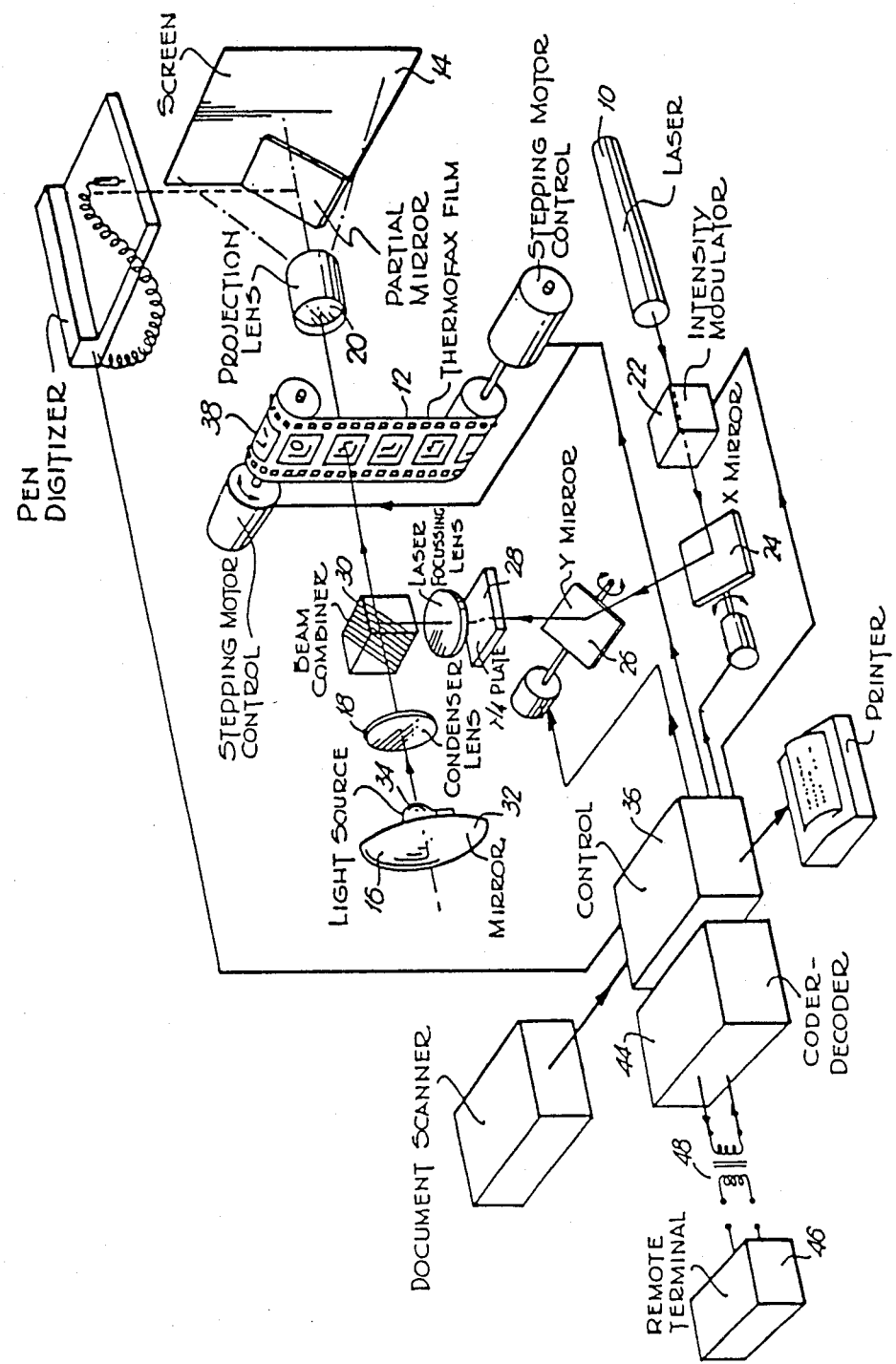

INTERACTIVE VIEWGRAPH SYSTEM

This invention relates to an interactive viewgraph system particularly useful as an aid to teleconferencing.

Simultaneous voice and data communication between two or more people, especially if common data can be viewed and manipulated, is a useful communication mode since frequently during a teleconference, participants wish to discuss and amend a document which might be held at one or more of the linked teleconference locations. The document could, for example, contain figures or tables such as sales reports, inventory lists, legal tests, contracts or jointly authored documents.

One way of achieving this particular voice and data communication which, incidentally, is often called "shared visual space", is with the aid of electronic memory and data processing equipment to which all parties have access. In addition to being expensive, a hard copy record of the viewed and manipulated data is neither easily generated nor readily accessible.

An arrangement is now proposed to overcome these disadvantages of a purely electronic implementation of the "shared visual space" concept.

According to one aspect of the invention, there is provided a terminal for a communications link, the terminal comprising:

generating means for generating an image in response to a data stream, projection means for simultaneously projecting said image onto a viewing screen, a first data input port for data entry to said data stream from a remote terminal, a second data input port for data entry to said data stream from local data generating means, and a data output port for sending data generated at said local data generating means to the remote terminal.

The terminal can include a heat sensitive film for generation of the image thereon. The film can be mounted in the form of a cassette for easy forward and reverse drive thereof. The image on the film can be generated using a laser, the laser output being directed at the film using X-Y position modulators. The laser output intensity can be made variable to produce corresponding variation in image intensity. The data generating means can comprise an optical scanner for scanning documents. Alternatively, or in addition, the optical scanner can include an X-Y pen digitizer. For use with the pen digitizer, the terminal can have a back projection means for displaying a subsidiary image at a target area sensitive to the X-Y digitizer pen. Alternatively, the target area and the viewing screen can be combined as one entity.

According to another aspect of the invention, there is provided a telecommunications link comprising a pair of terminals as previously defined, the link further comprising a transmission path for transmitting data from the output port of each terminal to the first data input port of the other terminal.

An embodiment of the invention will now be described by way of example with reference to the accompanying drawing which is a schematic perspective view of a terminal according to the invention.

Referring to the drawing in detail, light from a helium-neon laser 10 is directed through a number of modulators onto a thermosensitive film 12 where it is absorbed to generate an image. Using conventional projector optics, the image is projected onto a screen 14.

The colour of the thermosensitive plastic film 12 is chosen to act as a cut-off filter for the laser optical wavelength. For the helium-neon laser which has an output wavelength of 630 nm, a blue film is used. Parts of the film illuminated by the focussed laser light are heated owing to absorption of the light energy. By a thermal reaction within the film, the heated parts become darker, so generating an image on the film. From a projector light source 15, diffuse light is directed to the film through a condensor lens 18. Light passes through the film to a projection lens 20 by means of which the image is projected onto the viewing screen 14. Combination of the laser and projection optics means that image generation and projection are simultaneous.

The laser output is modulated by a modulator 22 which attenuates the laser output intensity and by X and Y modulators, 24 and 26, for altering the position of a focussed spot in the plane of the film 12. The intensity modulator is, for example, a low voltage light modulator model PC100, available from Electro-Optic Developments Limited. Briefly, the modulator operates by altering an applied electric field to produce a corresponding alteration in the polarizing direction of a birefringent crystal. The plane of polarization of light exiting the crystal can thus be changed to regulate the intensity of the light which subsequently passes through a polarizing screen incorporated within the modulator. A semiconductor injector, the output of which can be modulated simply by altering drive current to the device, can be used as an alternative to the externally modulated helium gas laser.

The X and Y modulators are, for example, optical scanners, model No. G306PD available from General Scanning Inc., the scanners being arranged in an X-Y configuration. Briefly, the scanners are small mirrors mounted on the axes of galvanometers, the angle of rotation of the mirrors being proportional to the current applied to the galvanometers. In order to maximize laser output reaching the film, the output from the modulators is directed through a half wave plate 28 obtainable, for example, from Melles Griot under the model Number 02WRQ21 and a polarizing beam combiner 30 of a type, for example, obtainable from the same Company under model number 04LPB001. The beam combiner 30 must be as large as the image space on the film in order to prevent the beam combiner from casting a shadow on the viewing screen 14. The lens 31 is required immediately before the beam combiner to focus the laser beam onto the film surface. The projection optics including a mirror 32, bulb 34, and lenses 18 and 20 are standard and well-known in the film projection art.

Inputs to the modulators 22, 24 and 26 are derived from a control unit 36. A further output from the control unit drives a reversible stepping motor which controls the position of the film 12 which is mounted in a cassette 38. The control unit has inputs from an X-Y pen digitizer 40, a document scanner 42, and, a via a receiver-decoder 44, from a remote terminal 46.

Suitable pen digitizing arrangements are commercially available. One example, (not shown), for use directly with the projected image has a switch stylus located at one end of a wand which emits sound pulses when the operator pushes the stylus against the surface of a screen. The sound pulses are detected by two electret microphones located at opposite corners of the viewing screen. The pressure switch inside the wand simultaneously starts two counters corresponding to the respective microphones. Each counter stops at the moment that its corresponding microphone detects sound. The ratio of the two count values precisely defines the position of the stylus on the viewing screen and an appropriate instruction is generated and sent to the local and remote X-Y modulators.

As an alternative to this pen digitizing arrangement, a partial mirror can be inserted in the axis of the projection optics to direct a relatively smaller auxiliary image to a translucent pen digitizer target, for example, of the type made by Hewlett Packard (Model No. 9874A) or by Talos Systems Inc. In these arrangements, the image is projected from one side and input is achieved from the other side of the screen so providing accurate pen positioning capability.

A suitable document scanner which operates by scanning a line at a time with a resolution of about 200 lines/inch is available from Stewart Warner Inc. Binary video image data is generated and is used to modulate the X-Y modulators thereby duplicating the scanned input documents on the thermosensitive film 12.

In use, two of the terminals are connected via a communications channel and normally are used as an aid to a two-way voice link or a teleconference. The document scanner and the pen digitizer respectively generate picture and position information which is coded at coder-decoder 44 and then transmitted via the communication link 48. Document scanner data and pen digitizer data are differentiated by appropriate code words preceding the transmitted data. Film motor advance or rewind instructions are also transmitted with the data. A typical data transmission format is shown below:

8 bit words . . .

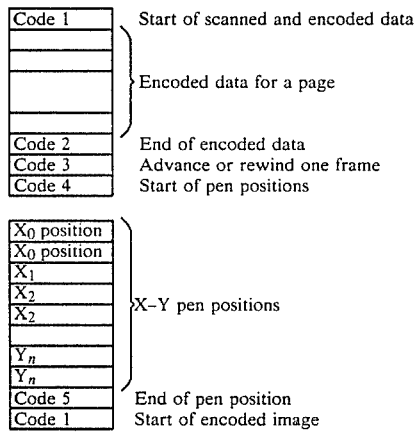

In addition to the codes associated with the various functions of each terminal, dedicated digital code words are also assigned to identify each terminal linked by the communication channel. In operation, the code words are used for system control, each terminal being polled sequentially. Although the subscribers to the link decide on which subscriber is to be in a transmissive mode and which subscribers are to be in a receive mode, computer control is necessary to arbitrate on which terminal of the participating terminals is to be in a write mode at a specific time.

It can be seen that the communication link provides simultaneous projection of prepared viewgraphs input into the document scanner by generating the image in the local and remote projector locations. The system can be used to modify an existing image whereby an interactive conference can take place using the shared visual space. The film material is advanced by a motor and gear system synchronously at the linked terminals every time a new document is put into the system. Previous parts of the film record can thus be brought back into view by reversing the cassette motor direction and a complete record of the conference will exist.

An advantage of the present system over television based document viewing systems is that the resolution achieved using the document scanner and the image generation and projection methods is higher than that which can be achieved using standard television cameras and monitors. On the other hand, modern facsimile terminals, although giving high resolution, are not particularly adapted to image projection. Lastly, known prior systems offer no easy way to incorporate pen digitizing data in such a way as to alter a projected image. The thermosensitive film is of relatively low cost compared with film based systems requiring chemical processing after film exposure.

What is claimed is:

1. A receiver-transmitter terminal for a communications link, the terminal comprising:
   a laser;
   means for directing a beam from the laser at a thermally sensitive film to thermally generate a hard copy image on the film in response to a data stream;
   projecting means for projecting light through said film simultaneously with generation of the hard copy image thereby to generate a further enlarged image at a viewing screen;
   a first data input port for data entry to said data stream from a similar remote terminal;
   local data generating means;
   a second data input port for data entry to said data stream from the local data generating means; and
   a data output port for sending data generated at said local data generating means to the remote terminal whereby the hard copy image can be generated and amended in real time by both a local participant accessing said data stream using said local data generating means and by a remote participant accessing the data stream using a data generating means at said similar remote terminal.

2. A receiver/transmitter terminal as claimed in claim 1, in which the sensitive film is stored as a film cassette, the terminal further comprising a motor for advancing and rewinding the film.

3. A terminal as claimed in claim 2, in which the motor is a stepping motor.

4. A terminal as claimed in claim 1, further including modulation means for modulating an output from said laser.

5. A terminal as claimed in claim 4, in which the modulation means includes an intensity modulator.

6. A terminal as claimed in claim 4, in which the modulation means includes a position modulator for modulating the position of a focussed beam from said laser incident on an image recording medium.

7. A terminal as claimed in claim 1, in which the projection means includes a bulb, a mirror for directing light output from the bulb through a condenser lens to an image recording medium and thence to a projection lens for projection of the enlarged image onto a viewing screen.

8. A receiver/transmitter terminal as claimed in claim 1, wherein the local data generating means comprises an optical scanner for scanning documents and an a-to-d converter for generating a binary video signal in response to a scanned image.

9. A receiver/transmitter terminal as claimed in claim 1 or 8 in which the local data generating means comprises an XY pen digitizer.

10. A receiver/transmitter terminal as claimed in claim 1, further comprising a coder-decoder for converting data from said data generating means into a form for transmission through a communication link and for converting data received on said communication link into a form for generating said hard copy image.

11. A receiver/transmitter terminal as claimed in claim 9, in which the viewing screen onto which the further image is projected has position identifying capability linked to said pen digitizer.

12. A telecommunications link comprising a pair of terminals as claimed in claim 1, the link further comprising a transmission path for transmitting data from the output port of each terminal to the first data input port of the other terminal and assignment means for directing one of the terminals into a transmissive mode and the or each other terminal into a receive mode.

* * * * *